April 26, 1927.
J. J. JAKOSKY
DRAIN DEVICE
Filed July 14, 1926.
1,626,089
2 Sheets-Sheet 1
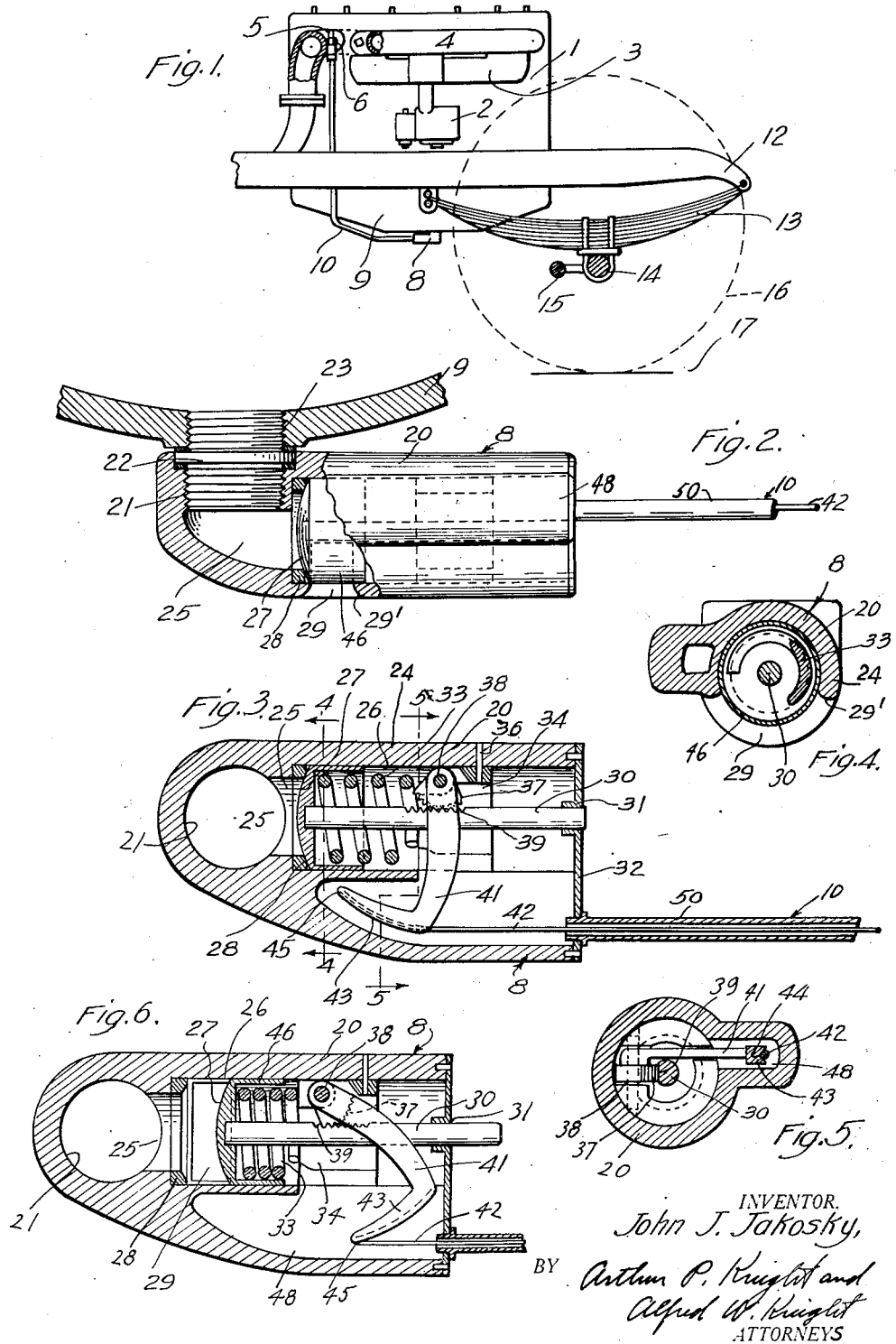
INVENTOR.
John J. Jakosky,
BY Arthur P. Knight and
Alfred W. Knight
ATTORNEYS April 26, 1927.
J. J. JAKOSKY
1,626,089
DRAIN DEVICE
Filed July 14, 1926  2 Sheets-Sheet 2
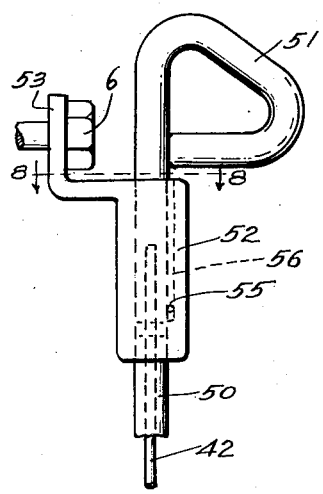
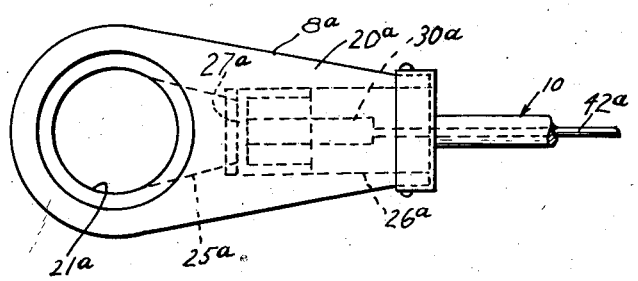
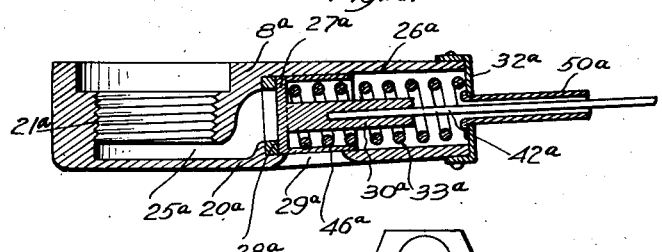
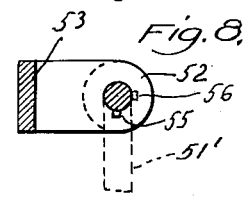
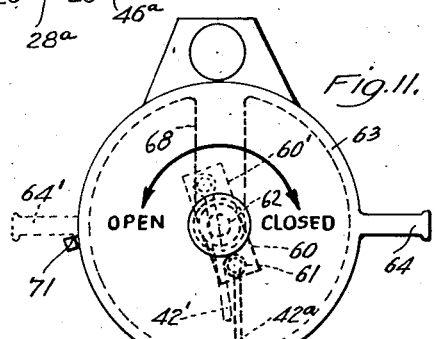
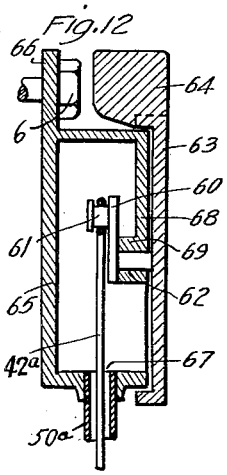
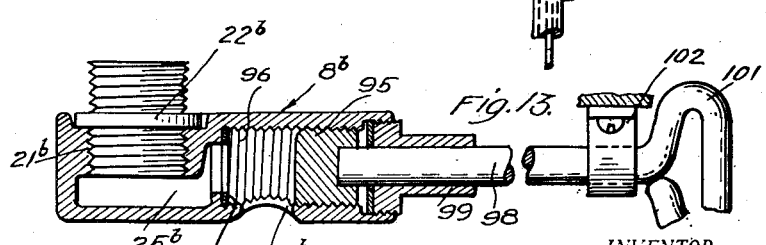
INVENTOR.
John J. Jakosky,
BY Arthur P. Knight and
Alfred W. Knight
ATTORNEYS Patented Apr. 26, 1927.

1,626,089

UNITED STATES PATENT OFFICE.

JOHN J. JAKOSKY, OF LOS ANGELES, CALIFORNIA.

DRAIN DEVICE.

Application filed July 14, 1926. Serial No. 122,365.

This invention relates to a device for draining a receptacle containing a fluent material, and particularly for draining a liquid from a receptacle or container in an automobile or other motor vehicle. For example, the device may be used for draining the oil from the crank-case or the water from the radiator of a motor vehicle.

The main object of the invention is to provide a drain device for this purpose, which may be operated from a remote point so that the drain device itself may be applied to the receptacle or container to be drained, while the operating means therefor may be disposed or mounted in a convenient position so as to permit easy access thereto and operation thereof. A further object of the invention is to provide a drain device which will permit a liquid to be drained from a receptacle without requiring the operator, or the person attending to the draining, to reach beneath the receptacle and remove a screw plug or open a valve such as is customarily provided at the bottom of the crank-case, radiator, or other liquid containing receptacle of an automobile or other motor vehicle.

A further object of the invention is to permit draining of liquid from a receptacle or container in a plurality of steps if desired. A further object of the invention is to provide for draining of the lower portion of a body of liquid from the receptacle, as for example the draining of accumulated water and sediment from the crank-case of an automobile engine.

A further object of the invention is to provide a drain device which may be easily operated and which provides a tight seal against leakage of liquid when in a closed position. A further object of the invention is to provide a drain device having means for preventing access of dust or foreign matter to the operating mechanism on the interior thereof.

A further object of the invention is to provide for maintaining the liquid passage through the drain member, and particularly the outlet opening thereof, substantially free from dirt or foreign matter and to prevent the accumulation of such dirt or foreign matter in the outlet opening of such liquid passage.

A further object of the invention is to provide a drain device in which the drain member is so constructed that, when connected to the outlet opening of a receptacle, it projects a minimum distance from the wall of said receptacle, so as to offer a minimum interference to the movement of other bodies relative to said vessel. This object is of particular importance when the device is applied to the drain opening at the bottom of a liquid receptacle of a motor vehicle, as it is especially desirable in such case that the drain member project as little distance as possible below such receptacle, which may, for example, be the crank case, in order to substantially eliminate or reduce the danger of the drain member striking against upward projections in the road.

The device by which the above described objects are accomplished comprises essentially a drain member which is adapted to fit, either directly or by means of a suitable connection, into the drain opening normally occupied by a screw plug or valve; said drain member being provided with a valve and with means for moving said valve to closed or open position; and said device further comprises manual or other operating means mountable at a convenient point and means connecting said operating means to the means for moving the valve. Furthermore, the drain member is formed with one dimension smaller than its other two dimensions, and is so constructed that, when connected to the drain opening of the receptacle, such smallest dimension is normal to the wall of the receptacle adjacent said opening. My invention further comprises certain additional features as hereinafter set forth.

The accompanying drawings illustrate embodiments of my invention and referring thereto:

Fig. 1 is a side elevation of an automobile engine showing a drain device applied to the crank case thereof in accordance with my invention.

Fig. 2 is a side elevation, partly broken away, of one form of drain member.

Fig. 3 is a horizontal section of the drain member shown in Fig. 2.

Fig. 4 is a section on line 4—4 in Fig. 3.

Fig. 5 is a section on line 5—5 in Fig. 3.

Fig. 6 is a horizontal section of the drain member with the valve in open position.

Fig. 7 is a side elevation of one form of manual operating means for the drain device.

Fig. 8 is a horizontal section on line 8—8 in Fig. 7, the handle 51 having been raised and turned through 90°.

Fig. 9 is a plan view of a modified form of drain member.

Fig. 10 is a vertical section of the drain member shown in Fig. 9.

Fig. 11 is a front elevation of one form of operating means especially adapted for use in connection with the drain member shown in Figs. 9 and 10.

Fig. 12 is a vertical section of the operating means shown in Fig. 11.

Fig. 13 is a vertical section of a modified form of drain member.

In Fig. 1 the automobile engine indicated at 1 is shown as provided with carbureter 2, intake manifold 3 and exhaust manifold 4 and with the other usual parts. On any automobile engine, as well as on the adjacent parts of the vehicle inside the hood, there are usually a considerable number of bolts, any one of which may be used for mounting the manual or other operating means for my drain device. For example as shown in Fig. 1 said operating means, indicated at 5, is mounted on one of the bolts 6 securing the exhaust manifold to the engine block. It will be understood, however that the operating means may be mounted at any desired or convenient point at either side of the engine or in any other suitable position with respect thereto.

The drain member 8 is shown as connected at the bottom of the crank-case 9 of the engine, and means such as Bowden wire 10 may be provided for connecting said manual or other operating means to the drain member for operation thereof as hereinafter described. One of the longitudinal frame members of the automobile is indicated at 12, a front spring at 13, the front axle at 14, the transverse tie rod at 15, and a front wheel at 16, in order to show the position of the drain member with respect to other parts of the automobile and to the ground level which is indicated at 17. It will be seen from Fig. 1 that the drain member is in a fairly protected position so that there is no danger of it striking any part of the road when the automobile is in motion. The lowest portion of the drain member is at a considerably higher level than the front axle 14 and tie rod 15 so that said front axle and tie rod are more liable to strike portions of the road than is the drain member 8. Furthermore the drain member, as hereinafter described, is purposely made thin or of relatively small vertical dimensions so as not to project downwardly as would an ordinary valve fitting screwed into the drain opening.

Several different forms of drain members may be used without departing from my invention. For example as shown in Figs. 2 to 6 inclusive, said member may comprise a casing 20 formed at one end with a threaded recess 21 adapted to receive one end of an externally threaded coupling member 22, the other end of which is adapted to be screwed into the threaded drain opening 23 at the bottom of crank-case 9, it being understood that the usual screw plug is removed from opening 22 for this purpose. By providing coupling members whose upper ends are of different sizes, a single design of drain member may be applied to the drain opening of any desired receptacle. Recess 21 communicates through passage 25 with horizontal cylindrical chamber 26 which is formed in a horizontal barrel portion 24 of casing 20, and in which is slidably mounted a valve member 27 adapted to move horizontally into or out of engagement with a valve seat or gasket 28 which is disposed in a substantially vertical plane in the horizontal portion of passage 25. Said valve therefore cooperates with valve seat 28, to control communication between passage 25 and outlet or drain opening 29 in the lower wall of barrel portion 24 establishing communication between the liquid passage in the interior of the casing and the exterior. The edges of opening 29 are preferably rounded or flared outwardly and downwardly around said opening as at 29'. The dimensions of outlet opening 29 are, as shown, both greater than the thickness of the wall of the casing adjacent the same, so as to prevent the collection of foreign matter therein. The minimizing of the thickness of the wall adjacent opening 29, together with the flaring of the wall around said opening, not only reduces the tendency to plugging of the outlet opening, but also permits any dirt or foreign matter which may accumulate in the opening to fall away easily, and substantially without frictional resistance by the walls around the openings, upon application of oil pressure thereto when the valve is opened. It is evident from Figs. 2 and 4 that in any plug of dirt which might be formed in the opening 29, the side walls of such plug would be flared downwardly and outwardly to conform to the shape of the edges of said opening, and it is obvious that the force tending to hold such a plug upwardly against the flaring wall of the casing would be practically negligible, so that as soon as the valve member is drawn back to open the valve, and the pressure of the oil in the crankcase or other receptacle is applied to the top of the plug, the same will be readily displaced, leaving the opening perfectly free for outflow of oil. Valve member 27 is provided with a stem or rod 30 which is adapted to slide in suitable bearing means 31 in the end member 32 of the casing. A coiled spring 33 is mounted within the cylindrical chamber 26 and between valve member 27 and a sleeve 34 which is secured within barrel portion 24 in any suitable manner as by means of pins 36. Said spring therefore normally holds the valve member 27 in closed position and is of sufficient strength to maintain said valve tightly closed so as to prevent leakage of oil therethrough.

Means are provided for moving the valve to partly or wholly open position, such means comprising for example a gear segment 37 pivotally mounted for example on vertical pivot means 38 on sleeve member 34, said gear segment engaging rack portion 39 on valve stem 31. A lever arm 41 is secured to gear segment 37, the outer end of said lever arm being connected to one end of the pull wire 42 of Bowden wire 10 aforesaid. In order to provide for a constant length of lever arm I prefer to provide lever 41 with an arc-shaped portion or arm 43 at its outer end, said arc-shaped portion being grooved as at 44 so as to receive wire 42 and said wire being connected to the far end of said arm as at 45. Gear segment 37 and lever arm 41 are thus seen to constitute a motion-reducing lever system operating in a substantially horizontal plane.

The valve 27 is preferably provided with closure means such as projecting cylindrical portion 46 which is adapted to extend over and close opening 29 when the valve is in closed position so as to prevent entrance of dust or other foreign matter to the interior of the drain member, said cylindrical portion also serving, in conjunction with bearing 31, to slidably support and guide the valve mechanism in the proper position. The outward flaring of the wall around said opening provides a sharp upper edge which serves to scrape any collected dust or foreign matter from the bottom of closure means 46 upon opening of the valve and also prevents foreign matter from adhering to such wall and bridging across or plugging up the opening. Casing 20 may be provided with a lateral extension 48 into which lever arm 41 projects so as to permit the use of a lever arm of sufficient length to give the desired ratio between the power applied to wire 42 and the power delivered to valve stem 30. Cylindrical chamber 26, together with extension 48, forms an interior chamber through a portion of which the oil is permitted to flow from the opening from the drain opening to the outlet 29, and within which are mounted the valve and the operating mechanism therefor, while the closure means 46, is adapted to prevent access of foreign matter to such interior chamber when the valve is in closed position.

The Bowden wire 10 may comprise the usual tubular casing 50, which is suitably connected at one end to casing 20 or to the end member 32 thereof as shown and within which wire 42 is adapted to slide. The operating means may comprise, as shown in Figs. 7 and 8, a suitable handle 51 which is secured to the other end of wire 42 while the other end of tubular casing 50 may be suitably connected to supporting bracket 52 which is provided with a lug 53 adapted to fit under a suitable bolt such as the bolt 6 aforesaid, for securing the bracket 52 to the engine or to a suitable part of the automobile or other motor vehicle in any desired position so as to permit convenient access to and operation of handle 51. Said handle 51 may be slidably mounted within bracket 52 and may be provided with a projecting pin 55 engaging in a longitudinal groove or slot 56 in said bracket, said pin 55 being adapted, when handle 51 is pulled out to open the valve and is given a slight turn in either direction, to engage the upper face of bracket 52 so as to hold handle 51 in this position and maintain the valve in open position.

The operation of the above-described device is as follows:

When operating handle 51 is in the position shown in Fig. 7, the parts of the valve mechanism are in the position shown in Figs. 2 and 3 so that valve 27 is tightly seated against gasket 28 and prevents communication between passage 25 and opening 29 so that the liquid, in this case the lubricating oil is retained in the receptacle (in this case the crank-case) and drainage or leakage thereof is prevented. When, however, handle 51 is raised a pull is exerted on wire 42 which moves lever 41 to the position shown in Fig. 6 and by operation of gear segment 37 upon rack 39 the valve 27 is moved to open position, thus permitting free communication between passage 25 and opening 29. The oil is thus permitted to drain from the crank-case, handle 51 being turned to the position indicated at 51' in Fig. 8 so that pin 55 engages the top of bracket 52 and holds the handle in raised position so as to maintain the valve in open position. The draining operation may however be stopped at any time, whether or not the liquid has been completely drained, by simply turning handle 51 into such position that pin 55 enters groove 56 and permitting said handle to be drawn inwardly by the action of spring 33 which restores valve 27 to closed position.

It will be seen that with such an arrangement the oil may be drained from the crank-case in increments of any desired size so that it is possible to drain such oil without requiring a receiving container of sufficient capacity to hold the entire contents of the crank-case. This is to be distinguished from the usual conditions prevailing when a screw plug is used for draining the oil from the crank-case. Under such conditions, once the plug has been removed it is practically impossible to reinsert the same in the drain opening until the draining is completed and it is therefore necessary that a receiving container be provided of sufficient size to hold all of the oil to be drained from the crank case. A further advantage of this arrangement is that a small quantity of impure oil, or water, sediment, etc., may be drained from the bottom of the crank-case by opening the drain valve for only a short period, without disturbing the remainder of the body of oil. In this way the lubricating oil may be kept at all times in clean condition, free from water and sediment, which are injurious if allowed to remain and accumulate in the oil.

It will be seen that when the valve is in closed position, closure means 46 thereon closes off the outlet opening 29, thus preventing access of dirt or foreign matter not only to the valve and valve seat but also to the operating mechanism in chamber 26. Furthermore the lower wall of chamber 26 is relatively thin as compared to the dimensions of outlet opening 29, so that there is little if any tendency for dirt or foreign matter to accumulate in said opening. The only place where such dirt can adhere when the valve is closed is on the under side of closure means 46 and any material which so adheres is scraped off by the edge of opening 29 when the valve is opened, thus keeping said opening unobstructed by foreign matter at all times when the valve is opened.

Another modification of the invention is illustrated in Figs. 9 to 12 inclusive. This form of the invention also provides for power-multiplying means such that the power which it is necessary to apply to the operating means to cause operation of the drain valve is less than the actual power required to move the valve. In this case however the power-multiplying device is provided adjacent the manual or other operating means instead of adjacent the valve. The drain member 8ª shown in Figs. 9 and 10 comprises as before a casing 20ª provided with a threaded recess 21ª for the same purpose as before, and also provided with a horizontal cylindrical chamber 26ª, passage 25ª, drain opening 29ª, and valve member 27ª controlling communication between passage 25ª and opening 29ª and seating against gasket 28ª. Valve 27ª is provided as before with a projecting cylindrical portion 46ª for closing the opening 29ª when the valve is in closed position for the purpose above-mentioned. Spring 33ª engages valve member 27ª and the end member 32ª so as to normally hold the valve member in closed position.

In this case however the pull wire 42ª is connected directly to valve stem 30ª and extends as before through tubular casing 50ª to the operating means shown in Figs. 11 and 12. Said operating means comprises a lever arm 60 to which the end of wire 42ª is connected as at 61, said lever arm being rotatably mounted at 62. Suitable manually or otherwise operated lever means of greater effective length than the lever arm 61 are provided. Such lever means comprises, for example, a disc or plate 63 secured to lever arm 60 for rotation therewith and provided with an operating lug or handle 64. Suitable means are provided for mounting the above-described operating means at a point convenient to the engine or other part of the motor vehicle, such mounting means comprising for example a casing 65 having a lug 66 adapted to receive bolt 6 for securing the same in position and also provided with an opening 67 through which the pull wire 42ª projects and with a radial arm 68 having bearing means 69 at its inner end for rotatably supporting the lever arm 60 and plate 63. Casing 65 is provided with a lug or projection 71 forming a stop against which handle 64 is adapted to rest when moved to open position.

In this form of the invention when the drain valve is in closed position the operating means are in the position shown in Fig. 11, while in Fig. 12 such operating means are shown in an intermediate position in order to more clearly show the construction thereof. When it is desired to open the valve, the lug or handle 64 is moved to position indicated at 64' so that a pull is exerted upon wire 42ª, thus drawing back the valve member 27ª to open position and permitting free communication between passage 25ª and opening 29ª. The positions which lever arm 60 and wire 42ª occupy at this time are indicated in light dotted lines at 60' and 42' and it will be seen that in this position the lever arm has passed dead center so that it is prevented from returning to normal position, while further rotation is prevented by the handle 64 coming against stop 71. The valve member is thus held open until the desired amount of liquid has been drained, when handle 64 is turned in the reverse direction sufficiently to carry the lever arm beyond dead center, the remaining portion of the return movement being accomplished by spring 33ª so as to again restore the valve member 27ª to closed position.

It will be seen that in both of the above described forms of the invention, the drain member has one dimension smaller than its other two dimensions, and is so connected to the receptacle that such smallest dimension extends normal to the wall of the receptacle. When applied to a drain opening at the bottom of a crank-case or other receptacle as shown, the wall of such receptacle extends in a substantially horizontal direction, and the minimum dimension of the drain member is therefore vertical. This minimizing of this dimension of the drain member is brought about by providing a liquid passage therein which, throughout a portion at least of its length, extends in a direction substantially perpendicular to such minimum dimension, or in this case horizontally, and which is provided with a valve seat lying substantially in the same plane as such minimum dimension, or in this case a vertical plane, and a valve which is movable in a direction substantially perpendicular to the minimum dimension, or horizontally, into or out of engagement with said valve seat so as to control flow of liquid therethrough.

A simple form of the invention which may be suitable for use on certain types of automobiles is shown in Fig. 13. In this case the drain member 8$^a$ is provided with internally threaded recess 21$^b$ adapted to receive the above described coupling member 22$^b$ for connection to the drain opening of the crank-case or other liquid receptacle, and is also provided with passage 25$^b$ and drain opening 29$^b$. The valve member is in this case formed as a screw plug 95 screwing into an internally threaded horizontally extending recess 96 in the drain member and adapted to seat against gasket 97 so as to control communication between passage 25$^b$ and drain opening 29$^b$. The means for moving the valve to closed or open position may comprise in this case a stem or rod 98 connected at one end to the valve member 95 and extending through suitable supporting sleeve 99 and provided at its other end with operating means such as handle 101. The stem 98 may be of such length that the operating handle 101 is presented in convenient position for operation without necessitating getting under the automobile. If desired a small supporting bracket 102 may be mounted on any suitable or convenient portion of the automobile engine or body so as to support the operating handle at the outer end of stem 98.

The operation of this form of the invention will be readily understood. To close the drain valve it is only necessary to turn handle 101 in the proper direction to bring the valve member 95 against gasket 97 and it will be seen that when in closed position the valve member also serves to close drain opening 29$^b$ so as to prevent access of foreign matter. Turning of handle 101 in the reverse direction moves valve member 95 in such direction as to open both of the openings controlled by said valve and permit flow of liquid therethrough for draining purposes. As in the other forms of the invention such draining operation may be stopped at any desired point for the purposes above mentioned.

It will be seen that all of the forms of drain member above described are of such design as to have a small vertical dimension, such vertical dimension being preferably considerably less than the larger horizontal dimension of the drain member, so that the distance through which the drain member projects below the crank-case or other receptacle to which it is attached is reduced to a minimum and the liability of damage to the same is thereby minimized. The design of the drain member so as to provide for this minimum projection thereof below the receptacle to which it is attached forms an important feature of my invention. The minimizing of the vertical dimension of the drain member is brought about by mounting the valve member to move horizontally and providing operating means therefor which also operate horizontally. As the largest dimension of the drain member is necessarily in the direction in which the valve member and the operating mechanism therefor move, it is evident that a material advantage is realized by causing this movement to take place in a horizontal direction.

While I have shown and described my drain device as applied particularly in connection with the crank-case of an automobile for the purpose of draining the lubricating oil therefrom, it will be understood that the same may be applied in a similar manner to any liquid receptacle of an automobile or other motor vehicle or any other liquid receptacle, particularly a receptacle whose drain opening is not in a position of convenient access, and when so applied the device will permit the opening of the drain valve from a remote point which is easily accessible and will also permit any desired portion of the liquid to be drained from such receptacle. For example the device may be applied to the drain opening of an automobile radiator so as to permit draining of the water therefrom, or to the gasoline tank thereof so as to permit ready removal of gasoline therefrom. The last-named application is of advantage in permitting small amounts of gasoline to be quickly and easily withdrawn from the gasoline tank, for priming or other purposes, as is often required.

Furthermore, while I have described my drain device particularly in connection with the drainage of liquids, it will be understood that it may be applied for the purpose of permitting outflow from a receptacle of any fluent material or material capable of flowing. In addition to actual liquids, therefore, the drain device may be used in connection with viscous, semi-solid substances or with such powdered or divided solid materials as flour, bran, sugar, etc., which are of such a nature as to flow unless restrained from doing so. The drain device of my invention may be advantageously attached to the receptacle in which any substance of the above class is stored or contained, for the purpose of controlling the outflow of such substance therefrom by operation from a point remote from the point of attachment of the drain device.

The drain device of my invention need not in all cases be connected at the bottom of the receptacle to be drained, but may in some cases be connected at the side thereof. In such cases, also, the feature of my invention which relates to the design of the drain member in such manner as to project a minimum distance from the wall of the receptacle, is of material advantage, as it minimizes the liability of said member being hit or damaged or of its interfering with other adjacent parts or mechanism. In general terms therefore, I prefer to provide, as shown, a drain member whose dimension in a direction normal to the surface of the wall of the receptacle to which it is connected is substantially less than either of its other dimensions. In all forms of the invention shown, it will be seen that, in general terms, the valve member and the operating mechanism therefor are mounted to move in a plane substantially parallel to the surface of the receptacle at the point of connection, thus permitting a minimum dimension of the drain member normal to the receptacle.

Any suitable means may be provided or employed for connecting the drain member to the receptacle, in such manner that the passage therethrough communicates with a drain opening, either already existing or especially provided for the purpose, in the wall of the receptacle.

I claim:

1. A drain device for liquid receptacles comprising, in combination with a receptacle having an opening in its wall, a drain member comprising a casing one of whose dimensions is materially less than either of its other two dimensions, said casing having a liquid passage therein, a valve seat in said liquid passage, a valve member movable in a direction perpendicular to said least dimension into and out of engagement with said valve seat, means for operating said valve member, means connecting said drain member to said receptacle with said least dimension of the drain member perpendicular to the wall of the receptacle, means establishing communication between said liquid passage at one side of said valve seat and said opening in the wall of the receptacle, and an opening in said casing establishing communication between said liquid passage at the other side of said valve seat and the outer air.

2. A drain device for liquid receptacles comprising, in combination with a receptacle having an opening in its bottom wall, a drain member, means for connecting said drain member to said receptacle adjacent said opening, said drain member being so formed that when so connected its vertical dimension is materially less than either of its horizontal dimensions, a liquid passage extending through said drain member, a valve seat in said liquid passage, said liquid passage communicating at one side of said valve seat with said opening in the receptacle and at the other side of said valve seat with the outer air, a valve within said drain member and movable horizontally into and out of engagement with said valve seat, and means for operating said valve.

3. A device for draining liquid from the bottom of a liquid receptacle, comprising a casing having its vertical dimension smaller than either of its horizontal dimensions, a liquid passage within said casing and having a portion at least extending substantially horizontally, a valve seat in said liquid passage and disposed in a substantially vertical plane, a valve within said casing and movable substantially horizontally into or out of engagement with said valve seat, means for operating said valve and an outlet opening in the bottom of said casing establishing communication between said liquid passage and the exterior.

4. A liquid drain device as set forth in claim 3, said valve being also provided with closure means adapted to close said outlet opening in the casing when the valve is in engagement with said valve seat, and to open said opening when said valve is moved out of such engagement.

5. A liquid drain device as set forth in claim 3, said valve operating means including a motion-reducing lever system operating in a substantially horizontal plane.

6. In a liquid drain device, a casing, a liquid passage within said casing, a valve seat in said passage, an opening in the bottom wall of said casing establishing communication between said liquid passage and the exterior, both dimensions of said opening being greater than the thickness of the wall adjacent said opening and said wall being flared downwardly and outwardly from its upper edge around said opening, a valve member movable within said casing and cooperating with said valve seat to control said liquid passage, and closure means on said valve member and movable across the inside of said opening so as to close the same when the valve is in closed position and to open the same when the valve is moved to open position, the sharp upper edge provided by the flaring of the wall around said opening being in position to scrape the surface of said closure means when the valve is moved to open position.

In testimony whereof I have hereunto subscribed my name this 9th day of July, 1926.

JOHN J. JAKOSKY.